UNITED STATES PATENT OFFICE.

JEAN J. LAFFITTE, OF PARIS, FRANCE.

WELDING-FLUX AND METHOD OF PREPARING AND USING THE SAME.

SPECIFICATION forming part of Letters Patent No. 286,311, dated October 9, 1883.

Application filed July 9, 1883. (Specimens.) Patented in France August 16, 1879, No. 132,279, and in England February 11, 1882, No. 672.

*To all whom it may concern:*

Be it known that I, JEAN JULES LAFFITTE, edge-tool maker, of Paris, France, have invented certain new and useful Improvements in Material for Welding Metals and in the Method of Manufacturing the Same; and I do hereby declare that the following is a full, clear, and exact description of the invention, which will enable others skilled in the art to which it appertains to make and use the same.

In welding metals it is usual to apply to the surfaces that are to be united fluxing material—such as borax or sal-ammoniac—in order to eliminate foreign substances, the presence of which prevents the formation of a perfect weld; but it is difficult in most cases to apply such material with certainty and uniformity, particularly when the surfaces to be united are large or irregular or convex.

This invention relates to means of insuring more complete application of such material, and of facilitating the welding operation and rendering sound the union made by it; and it consists, mainly, in forming the fluxing material into a flexible sheet, whereby it can be applied perfectly to the entire surface to be welded, the sheet adapting itself readily to the configuration of such surface. For this purpose the fluxing material—such as borax—is mixed with filings of the metals to be welded, and this compound material is then agglomerated under pressure into the form of a sheet, which is placed between the two pieces to be united. The whole is heated to the required degree, and then subjected to percussion or pressure for welding in the usual manner.

In carrying the invention into practice, I first melt a fluxing material—such as borax; secondly, I dip therein a support of paper, metal, or other appropriate material, so as to coat it therewith on both sides; thirdly, I pass the sheet between pressure-rollers, in order to equalize the surfaces thereof; fourthly, I dust both surfaces with metallic filings of the same nature as the metals to be welded; fifthly, I introduce the same in an oven, in order to soften the borax; and sixthly, I pass the sheet a second time through pressure-rollers, for the purpose of embedding the filings in the softened borax; or I dispense entirely with the paper or other support, and I mix metal filings in the melted borax, and I roll out the mixture into sheets; and for the purpose of preserving these sheets made with or without a support, and preventing their disaggregation during carriage or manipulation, I coat them on both sides with an appropriate varnish—such as gum-lac.

For the manufacture of the sheets with a support and without a support, I find that the following proportion, by weight, of materials gives very good results. Sheets with a support: borax, twenty-five parts; support, five parts; filings, sixty parts. Sheets without a support: borax, twenty-five parts; filings, sixty parts.

These sheets should be about one-sixteenth of an inch thick.

For the purpose of welding iron to iron, steel to steel, or iron to steel, I place between the two pieces to be welded a sheet of my welding material, covering the surfaces to be welded. I heat these parts and treat them as is usual in welding, and the result is a thorough uniform weld without any imperfections. In practice it is preferable to limit the use of welding-sheets made without a support to operations on relatively small surfaces. The welding may also be effected in a mold with one piece solid laid therein, and its upper surface covered with one of my welding-sheets, while the other piece is formed in the mold by running molten metal therein, which imparts the requisite heat to the solid metal for uniting intimately the two. For this purpose the mold may be previously heated, if necessary.

I claim—

1. A welding material composed of twenty-five parts, by weight, of borax, a paper or metallic support, and sixty parts of metallic filings of the same nature as the metals to be welded, and made by first melting the borax; second, immersing the support in the fused borax; third, smoothing the same by passing it through pressure-rollers; fourth, sprinkling its two faces with the metal filings; fifth, heating the sheet in an oven; and sixth, passing it through pressure-rollers, as and for the purpose described.

2. A welding material composed of borax and of metallic filings of the same nature as the metals to be welded, mixed with the fused borax, and in the proportions substantially as set forth, and then rolled out into sheets of about one-sixteenth of an inch thick, as and for the purposes described.

3. The welding-sheets made as hereinabove described, and then coated with a layer of gum-lac or other appropriate varnish, as and for the purpose set forth.

4. The described method of making flexible sheets of welding material, adapted to be applied to the entire surface to be welded, consisting in mixing borax in the proportions named with metallic filings of the same nature as the metal to be welded, uniting the same, if desired, to a foundation or support, and rolling or forming the product into thin sheets ready for use, all substantially as set forth.

In testimony whereof I hereby affix my signature in presence of two witnesses.

JEAN JULES LAFFITTE.

Witnesses:
R. H. BRANDON,
H. MÉA.